United States Patent [19]

Hennig et al.

[11] 4,152,057
[45] May 1, 1979

[54] FILM TRANSPORTING MECHANISM

[75] Inventors: Fridolin Hennig, Zorneding; Adam Hummel, Munich, both of Fed. Rep. of Germany

[73] Assignee: AGFA-Gevaert, A.G., Leverkusen, Fed. Rep. of Germany

[21] Appl. No.: 827,171

[22] Filed: Aug. 24, 1977

[30] Foreign Application Priority Data

Aug. 25, 1976 [DE] Fed. Rep. of Germany ....... 2638295

[51] Int. Cl.² .............................................. G03B 17/50
[52] U.S. Cl. ..................................................... 354/86
[58] Field of Search .................. 354/83, 86, 275, 276, 354/212, 213, 288

[56] References Cited

U.S. PATENT DOCUMENTS

| 2,496,630 | 2/1950 | Land | 354/288 X |
| 3,872,485 | 3/1975 | Asano | 354/288 X |
| 3,965,480 | 6/1976 | Eloranta | 354/86 X |

FOREIGN PATENT DOCUMENTS 2416589 10/1974 Fed. Rep. of Germany ........... 354/276

Primary Examiner—Donald A. Griffin
Attorney, Agent, or Firm—Michael J. Striker

[57] ABSTRACT

A film transporting mechanism for an instant picture camera is described. Such cameras use film packs of the type having a cassette provided with a film window and a discharge slot in one of its end walls through which exposed film sheets are expelled. The film transporting mechanism has a pair of film transporting rollers which form a nip and are so located that the nip is adjacent the discharge slot when the camera is loaded with a film pack. Members are provided which can enter the cassette through the film window in the region of the other end wall to frictionally engage a film sheet behind the window. A motion-transmitting arrangement, when actuated by an input member, moves the members towards the film transporting rollers. At the same time it first moves them through the window into contact with the film sheet so that they advance the same towards the discharge slot; after the members (and the film sheet) have travelled part-way towards the rollers (so that a leading end of the film sheet enters the nip), the members are lifted out of engagement with the film sheet which is then withdrawn by the rollers.

10 Claims, 2 Drawing Figures

FILM TRANSPORTING MECHANISM

BACKGROUND OF THE INVENTION

1. Field of Art

The present invention relates to a film transporting mechanism for cameras.

More particularly, the invention relates to a film transporting mechanism for self-developing (instant-picture) cameras.

2. The Prior Art

Self-developing cameras are known per se. They utilize a film pack cassette having a housing which is provided in one of its major wall surfaces with a film exposure window. A stack of individual film sheets is located in the housing and biased towards the exposure window by a spring or the like. After an exposure, during which the film sheet closest to (i.e., immediately behind) the exposure window is exposed to scene light, the just-exposed film sheet is expelled from the housing through a slot in one of its endwalls, thus placing the next (subjacent) film sheet in position for exposure.

Since the film sheets are of the self-developing type they must not only be transported, but the developer (contained in a pouch of each film sheet) must be squeezed out and spread over the exposure area of the film sheet. To effect these functions, a pair of nip rollers is provided which are so located that when the camera is loaded with a film pack the discharge slot of the latter becomes positioned adjacent to the nip. After exposure the film sheet is then expelled through the discharge slot until its leading end enters the nip of the rollers; thereafter, the rollers (one or both of which are of course driven) transport the film sheet further and, during its passage through the nip, the developer is squeezed and spread due to the pressure exerted by the rollers.

Two different types of such film packs are known, both operating on the principle outlined above. Both of these types have cassette housings which are provided with a special slot through which a gripper of the camera film transporting mechanism engages a lateral edge of the respectively uppermost film sheet to push the film sheet into the nip of the transport and developer rollers (hereafter called "transporting rollers" for simplicity).

Because the gripper exerts asymmetrically acting forces upon the film sheets (it engages only one lateral edge), the prior-art arrangements are not always able to shift the film sheets properly (and in proper orientation) into the nip of the transporting rollers. One problem that is encountered, is that the film sheet being shifted tends to be pressed against the sidewall of the cassette with its lateral edge that is opposite to the one engaged by the gripper; this of course results in transporting difficulties.

SUMMARY OF THE INVENTION

It is an object of the invention to overcome the difficulties of the prior art.

More particularly, it is an object of the invention to provide an improved film transporting mechanism for instant-picture (self-developing) cameras which avoids those difficulties.

Another object is to provide such a mechanism which requires lower forces for the expulsion of film sheets, than the prior-art mechanisms.

A concomitant object is to provide a mechanism of the kind in question which is able to apply expelling forces symmetrically to the respective film sheets.

Still a further object is to provide such a mechanism which can be used with the conventional film pack cassettes having the earlier-mentioned special slot for entry of the prior-art gripper, so that the use of the novel mechanism does not require the use of a differently constructed film pack cassette.

Yet an additional object is to provide such a mechanism which is reliable in its operation.

In keeping with these objects, and with others which will become apparent hereafter, one feature of the invention resides in a film transporting mechanism for a self-developing camera using film packs of the type having a cassette provided in a major surface with an exposure window and in one of two spaced endwalls with a slot for the seriatim discharge of exposed film sheets from a stack contained in the cassette. The mechanism comprises a pair of film transporting rollers forming a nip adjacent which the slot of the cassette becomes positioned when the camera is loaded; engaging means operative to engage a film sheet behind the window by entering the cassette through the same in the region of the other endwall; and means for displacing the engaging means towards the film transporting rollers to entrain the engaged film sheet and expel it through the slot and into the nip of the rollers.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
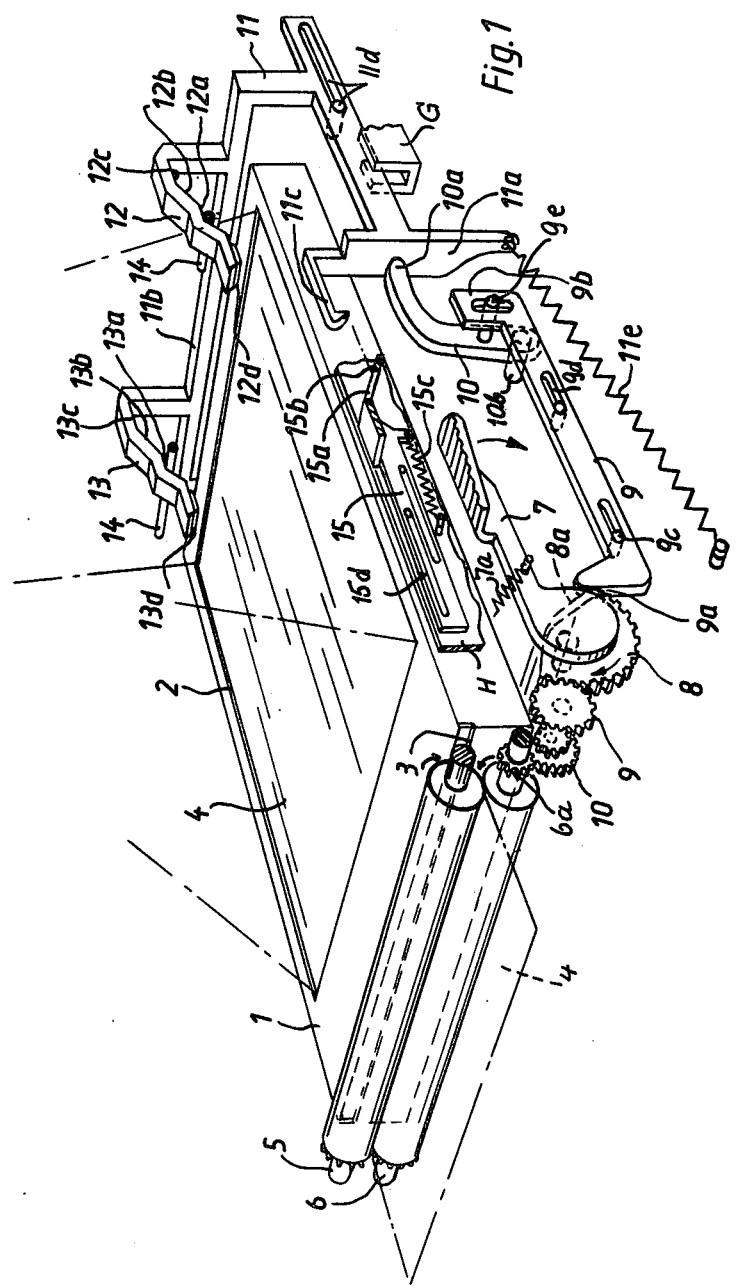
FIG. 1 is a somewhat diagrammatic illustration, showing one embodiment of the invention.

The Structure of FIG. 1

This Figure shows a film pack cassette 1 installed in operative position in an instant-picture camera housing of which only a portion H is shown, the rest of the housing being omitted to facilitate illustration of the inventive film transporting mechanism. In the conventional manner one of the major side walls of the (generally flat) cassette 1 is provided with a film exposure window 2. One of the two endwalls (the only one shown in the Figure) has a discharge slot 3. The interior of the cassette 1 accommodates a stack of film sheets 4 (one shown) which are urged (by not illustrated means, such as a spring) towards the film window 2. The area of the film sheet 4 which is bounded by the outlines of window 2 is the exposure area, i.e., the area onto which scene light will impinge upon operation of the not-illustrated camera shutter (see the boundaries of the incoming light rays which are indicated by broken lines) and where subsequently the picture will appear.

After the exposure has been made the upper (exposed) film sheet 4 must be expelled from cassette 1 through slot 3, until its leading end is engaged in the nip of a pair of transporting rollers 5, 6 of the camera which transport it further leftward (see the broken-line showing of film-sheet 4) while at the same time spreading developer over the exposure area. The transportation of the film sheet towards the rollers 5, 6 until engagement in the nip of the same, is carried out in the prior art by a gripper which extends through a slot in a sidewall of the cassette 1 and engages a lateral longitudinal edge of the film sheet to push the latter towards the rollers, 5, 6. This has the disadvantages mentioned earlier herein.

By contrast, the film transporting mechanism according to the invention has an input member 7 (e.g., a lever which is pressed by a finger of the user) which can be pivoted (here in clockwise direction) against the force of a restoring spring 7a. Of course, a different type of motion is also conceivable.

When the input member 7 is pivoted in clockwise direction it turns a gear segment 8 (which may be mounted on a shaft connected to the member 7 for rotation by the same). The gear segment 8 has a cut-away tooth-free edge face 8a. When it is thus rotated, gear sector 8 transmits motion to a gear train 9, 10 which in turn meshes with — and transmits motion to — a pinion bc mounted on the shaft (or a trunnion) of roller 6. Roller 6 entrains roller 5 frictionally.

A member 9 is secured to the housing H by means of slot-and-pin guides 9c, 9d which permit it to slide to and fro in direction parallel to the transportation of film sheets 4. One end portion 9a of member 9 engages the periphery of gear segment 8 in tracking engagement; the other end 9b is connected via a slot-and-pin guide 9e with a curved lever 10 which is pivotably mounted on the housing H at 10b. Lever 10 has a free end 10a which abuts a surface 11a of a further slidable member 11 that is also connected to the housing H by means of slot-and-pin guides 11d (at both lateral sides of cassette 1, although only the guide at one side is visible). The member 11 is U-shaped and embraces that end of the cassette 1 which is distal from the rollers 5, 6.

The transverse part 11b of member 11 (i.e., the bight of U) is provided with arms 12, 13 (a single one or more than two could be used instead). Arm 12 has two surfaces 12a and 12c which normally extend parallel to the plane of the window 2, and a surface 12b which connects the surfaces 12a, 12c and is inclined to them and to the plane of window 2. Arm 13 has corresponding surfaces 13a, 13b and 13c. The housing H has a single support (or separate supports) 14 which are engaged by these surfaces of the arms 12, 13. The free end portions of the arms are provided with parts (e.g., pads) of high-friction material (e.g., natural or synthetic rubber, synthetic plastic material, cork or the like), i.e., a material having a high coefficient of friction with respect to the surface of the film sheets 4.

An additional member 15 is connected to housing H via pin-and-slot guides 15d, to be movable towards and away from the rollers 5, 6. It has an inclined cam portion 15b which is provided with a hole or recess 15a. A spring 15c permanently urges the member 15 towards the rollers 5, 6 and a relatively strong spring 11e is connected to the member 11 and permanently urges it, also, towards the rollers 5, 6 whereby the surface 11a is maintained in abutment with the end portion 10a of lever 10. A hook 11c on member 11 cooperates with cam portion 15b and recess 15a, in a manner still to be described.

The Operation of FIG. 1

Assuming that the mechanism is in the illustrated starting position, pressure on the input member 7 in the direction indicated by the curved arrow will cause the input member to turn in clockwise direction. This rotates the gear segment 8 so that the member 9, whose end portion 9a tracks the face 8a, can move leftward under the bias of spring 11e which acts upon member 9 via member 11 and lever 10. The member 11 of course also moves in the same direction. Due to its pivotable mounting and its pin-and-slot connection to member 9, the lever 10 acts as a converter, so that a relatively small sliding displacement of member 9 permits a larger displacement of member 11 in the same direction. While the member 11 is drawn leftward by spring 11e, the spring also imparts to it a component of movement in anticlockwise direction (downward in FIG. 1), in that it tilts the member 11 to an extent which is governed by the depth of the groove in the guide rail G. This tilting, combined with the leftward movement, causes the surfaces 12c, 13a of the arms 12, 13 to slide off the supports 14, and the surfaces 12b, 12c and 13b, 13c then successively slide over these supports. The result is a downward movement of the end portions carrying the pads 12d, 13d so that they enter through window 2 and come to rest on the upper film sheet 4. This contact with film sheet 4 occurs when the upper ends of the inclined surfaces 12b, 13b move past the supports; during the subsequent leftward movement (i.e., while the leading ends of surfaces 12c, 13c move over supports 14 and until the latter become located at the trailing ends of these surfaces 12c, 13c, the arms 12, 13 push the film sheet 4 through slot 3 and towards the nip of rollers 5, 6. The distance between the leading and trailing ends of the surfaces 12c, 13c is so selected that when the leftward displacement of film sheet 4 by the arms 12, 13 is completed, the leading end of the film sheet 4 has just entered the nip of the rollers 5, 6 and is engaged by the same. Just prior to this the hook 11c rides up over the inclined cam portion 15b and drops into the recess 15a, thereby coupling the members 11 and 15 for joint movement and, due to the riding-up of the hook, imparting a clockwise tilt to the member 11 which is sufficient to lift the pads 12d, 13d out of engagement with the film sheet 4.

It must be understood that all of these previously described movements take place while the gear segment 8 performs only a relatively small angular movement. During the remainder of its movement, i.e., while the input member 7 continues to be turned, the members 11, 15 remain stationary and gear segment 8 transmits motion to the rollers 5, 6, causing them to transport the film sheet 4 through the nip and out the other side (see the broken-line showing).

When the expulsion of the film sheet 4 is completed, input member 7 is released by the user and is returned to its starting position by the spring 7a. The gear segment 8 now pushes the member 9 rightwards. Since hook 11c is still in recess 15a, the member 15 shares the movement of member 11 which is itself being pushed rightwardly by the member 9. When the member 11 has travelled far enough rightwardly for the surfaces 12b, 13b to contact the supports 14, these will lift the arms 12, 13 sufficiently for the hook 11c to become withdrawn from the recess 15a, permitting the member 15 to be restored (leftwardly) to its illustrated starting position by the spring 15c.

The spring 11e must be relatively strong to perform its intended function. When this spring is tensioned (as member 11 returns to the illustrated starting position) it is therefore necessary to supply some additional force which is capable of overcoming the spring force to tension the spring 11e. This force may be supplied by the user pushing the input member 7 in anticlockwise direction. Of course, in place of the illustrated mechanical force transmission (via the gearing and other elements) between input member 7 and member 11 it is also possible to provide a direct mechanical linkage between members 7 and 11. This would require higher force to be applied at the beginning of the transportation of the film sheets 4, but would not require the supplying of additional force towards the end of the return movement.

Figure 2:
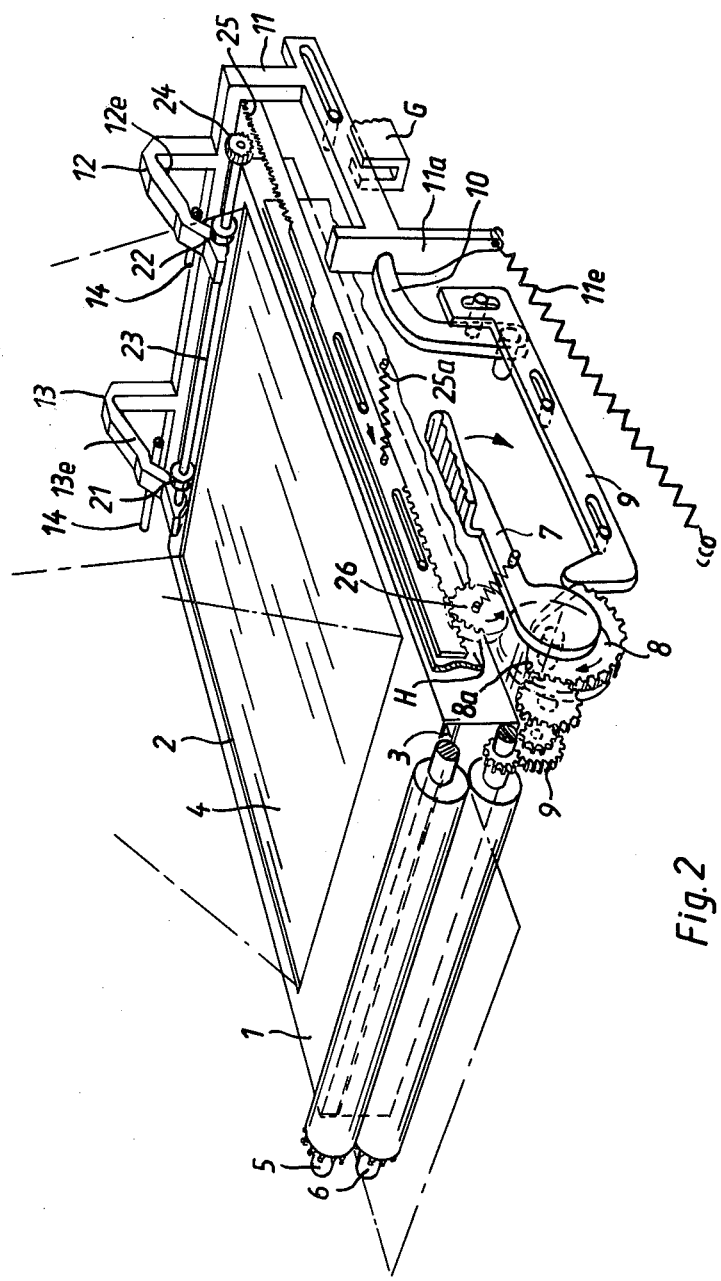
FIG. 2 is a view similar to FIG. 1 but showing another embodiment of the invention, the camera housing being omitted in both Figures to permit clearer illustration.

The Structure of FIG. 2

This Figure shows an embodiment which is generally analogous to the one in FIG. 1. Hence, elements identical with those of FIG. 1 are designated with the same reference numerals as in that Figure.

This second embodiment utilizes rolls 21, 22 (one roll or more than two rolls might be used) in place of the friction parts 12d, 13d. Rolls 21, 22 are mounted on a camera shaft 23 which is turnably journalled in arms 12, 13. One end portion of shaft 23 carries a pinion 24 which is located above a row of teeth on the upper side of a rack 25 that extends parallel to the path of film-sheet transportation and is shiftable along this path due to the fact that it is mounted on the housing H via the illustrated slot-and-pin guides. The rack 25 has another row of teeth in its underside and these mesh with a gear 26 which is driven by the gear segment 8. The circumferences of the rolls 21, 22 are made of (or provided with a layer of) material having a high coefficient of friction as described with reference to the pads 12d, 13d. The arms 12, 13 do not have the surfaces 12c, 13c; instead, the inclined surfaces 12e, 13e (which replace surfaces 12b, 13b) are correspondingly longer, as shown.

The Operation of FIG. 2

The operation of this embodiment is essentially similar to the one in FIG. 1. The difference is that as the member 11 moves leftward, the rolls 21, 22 are lowered onto the film sheet 4 due to the long inclined surfaces 12e, 13e and that, at the same time, the pinion 24 meshes with the rack 25. The latter is transported leftwardly upon clockwise movement of the input member 7, due to the rotation of gear 26. This transmits motion to the pinion 24, rotating the same and via the shaft 23 the rolls 21, 22 so that the rolls transport the film sheet 4 leftwards through the slot 3. The length of rack 25 is so selected that the rolls 21, 22 are rotated only until the leading end of the film sheet 4 enters the nip of rollers 5, 6 which engage it and continue its further transportation during continued clockwise displacement of the input member 7.

When the transportation is completed and the mechanism restored to its starting position (member 11 moves rightwardly to return to the illustrated position), the surfaces 12e, 13e slide over the supports 14 and the rolls 21, 22 are raised up. The rack 25 is moved rightwardly by gear 26 since a spring 25a urges the rack into mesh with the gear.

The invention can be modified in various ways which are intended to be encompassed in the scope of the appended claims.

It will be understood that in rest position, i.e., during the exposure of the film sheets to scene light, all parts of the arms 12, 13 are located outside the confines of the exposure area so as not to interfere with the picture being taken. Surprisingly — and quite contrary to all expectation — the pressure engagement of pads 12d, 13d or of rolls 21, 22 with the film sheets does not result in pressure-induced film exposure. Also, due to the fact that the transporting pressure by these pads or rollers act upon the end of the film sheet which is distal from the slot 3, the leading end portion of the uppermost film sheet (i.e., the one being transported) engages and slides along the upper edge of the slot 3 (since the sheet tends to tilt up slightly at this end portion under the pressure upon the other end portion), so that reliable and trouble-free movement of the film sheet through the slot is assured.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A film transporting mechanism for a self-developing camera using film packs of the type having a cassette provided in a major surface with an exposure window and in one of two spaced endwalls with a slot for the seriatim discharge of exposed film sheets from a stack contained in the cassette, comprising a pair of film transporting rollers forming a nip adjacent which the slot of the cassette becomes positioned when the camera is loaded; engaging means operative to engage a film sheet behind the window by entering the cassette through the same in the region of the other endwall, said engaging means comprising a member which is slidable in a path towards and away from said rollers and which includes engaging portions for the film sheet, displacing means comprising means operative during sliding of said member towards said rollers to initially effect entry of said engaging portions through the cassette window and into contact with the film sheet, and to subsequently effect retraction of the engaging portions from the film sheet, and means mounting said member for limited pivoting movement about an axis extending normal to said path and parallel to a plane of movement of said member, to permit said entry and retraction of said engaging portions; and means for displacing said engaging means towards said film transporting rollers to entrain the engaged film sheet and expel it through the slot and into the nip of said rollers.

2. A film transporting mechanism as defined in claim 1, wherein said engaging means comprise friction portions for frictionally engaging the film sheet.

3. A film transporting mechanism as defined in claim 1, said engaging portions having film-sheet engaging parts of a material having a high coefficient of friction.

4. A film transporting mechanism as defined in claim 3, wherein said parts are friction pads.

5. A film transporting mechanism for a self-developing camera using film packs of the type having a cassette provided in a major surface with an exposure window and in one of two spaced endwalls with a slot for the seriatim discharge of exposed film sheets from a stack contained in the cassette, comprising a pair of film transporting rollers forming a nip adjacent which the slot of the cassette becomes positioned when the camera is loaded; engaging means operative to engage a film sheet behind the window by entering the cassette through the same in the region of the other endwall, said engaging means comprising a member which is slidable in a path towards and away from said film transporting rollers and which includes at least one engaging roller for engaging the film sheet; and means for displacing said engaging means towards said film transporting rollers to entrain the engaged film sheet and expel it through the slot and into the nip of said rollers, said displacing means comprising means operative during sliding of said member towards film transporting rollers to initially effect entry of said engaging roller through the cassette window and into contact with the film sheet, and to subsequently effect retraction of the engaging roller from the film sheet.

6. A film transporting mechanism as defined in claim 5, said engaging roller having a circumferential surface of a material having a high coefficient of friction.

7. A film transporting mechanism as defined in claim 5, said engaging means comprising means mounting said member for limited pivoting movement about an axis extending normal to said path and parallel to a lane of movement of said member, to permit said entry and retraction of said engaging roller.

8. A film transporting mechanism as defined in claim 5; said engaging means further comprising a shaft on which said engaging roller is mounted for rotation with the shaft, and a pinion also mounted on and rotatable with said shaft; and wherein said displacing means further comprise a rack mounted to be slidable parallel to said path, and an input member for effecting such sliding of said rack, said pinion engaging with said rack in response to said entry of said engaging roller so as to receive motion from the sliding rack and thereby to rotate said engaging roller.

9. A film transporting mechanism for a self-developing camera using film packs of the type having a cassette provided in a major surface with an exposure window and in one of two spaced endwalls with a slot for the seriatim discharge of exposed film sheets from a stack contained in the cassette, comprising a pair of film transporting rollers forming a nip adjacent which the slot of the cassette becomes positioned when the camera is loaded; engaging means operative to engage a film sheet behind the window by entering the cassette through the same in the region of the other endwall; and means for displacing said engaging means towards said film transporting rollers to entrain the engaged film sheet and expel it through the slot and into the nip of said rollers, said displacing means comprising a rotatable gear segment having an edge face, an input member coupled with said gear segment to rotate the same, an elongated element extending lengthwise of said path and mounted for sliding displacement parallel thereto and having one end portion in tracking engagement with said edge face and another end portion, and a lever pivoted to said other end portion and bearing upon said engaging means.

10. A film transporting mechanism as defined in claim 9; further comprising a gear train driven by said gear segment; and wherein at least one of said rollers is provided with a pinion meshing with and driven by said gear train in response to operation of said input member.

* * * * *